United States Patent [19]
Koppe

[11] Patent Number: 5,367,592
[45] Date of Patent: Nov. 22, 1994

[54] CONNECTOR FOR OPTICAL FIBRES

[75] Inventor: Rudolf P. Koppe, Breda, Netherlands

[73] Assignee: U.S. Philips Corporation, New York, N.Y.

[21] Appl. No.: 971,962

[22] PCT Filed: Jun. 18, 1992

[86] PCT No.: PCT/NL92/00106

§ 371 Date: Feb. 18, 1993

§ 102(e) Date: Feb. 18, 1993

[87] PCT Pub. No.: WO92/22841

PCT Pub. Date: Dec. 23, 1992

[30] Foreign Application Priority Data

Jun. 18, 1991 [DE] Germany ............................ 4120038

[51] Int. Cl.$^5$ .............................................. G02B 6/38
[52] U.S. Cl. ........................................ 385/53; 385/56; 385/58
[58] Field of Search ................................ 385/53–75

[56] References Cited

U.S. PATENT DOCUMENTS

| 4,188,087 | 2/1980 | D'Auria et al. | 385/60 |
| 4,339,172 | 7/1982 | Leather | 385/70 |
| 4,877,303 | 10/1931 | Caldwell et al. | 385/55 |
| 5,228,105 | 7/1993 | Glista | 385/89 |

FOREIGN PATENT DOCUMENTS

| 413660 | 2/1920 | European Pat. Off. | G02B 6/38 |
| 209255 | 1/1921 | European Pat. Off. | H01R 13/523 |
| 360304 | 3/1928 | European Pat. Off. | G02B 6/38 |
| 205984 | 12/1930 | European Pat. Off. | G02B 6/38 |
| 2164760 | 3/1926 | United Kingdom | G01N 21/47 |

Primary Examiner—Frank Gonzalez
Attorney, Agent, or Firm—William L. Botjer

[57] ABSTRACT

A connector for optical fibres, in particular single mode fibres is proposed, comprising a connector pin which is fixedly secured to the fibre and a coupling sleeve which interconnects the two connector pins. To allow damaged connector portions to be replaced at low cost, three successive connectors (8,3,9) are provided for interconnecting two fibres (1,2) having a great length of several hundred meters, the two outer connectors (8,9) being connected with one connector pin (11,14 respectively) to one end of the two fibres (1,2 respectively) and the central connector (3) being connected to the other connector pin (12,13 respectively) of each of the outer connectors (8,9 respectively). Said fibre connection (7) can be interrupted by disconnecting the central connector members (3).

4 Claims, 1 Drawing Sheet

CONNECTOR FOR OPTICAL FIBRES

BACKGROUND OF THE INVENTION

The invention relates to a connector for optical fibres.

Although optical fibres have been known for a long time, they have only recently been used to an increasing extent in communication engineering for a plurality of applications, such as FDDI networks (fiber distributed dam interface), Local Area Networks, computer interconnections, telephone exchanges, industrial control devices, transmission devices for television cameras. It is well-known that the optical fibres may be of the multimode type or the monomode type, i.e. dependent upon the size of the core diameter of the fibre either a plurality of modes can propagate or only one mode can propagate. In cores having a very small diameter of only 10 μm or less only one mode can propagate. Monomode fibres require high-precision connectors between the individual fibres or between the fibre end and the light source, having tolerances in the μm range. These connectors generally consist of two identical rotationally locked connector portions comprising a coupling member with an elastic sleeve. To optimize the transmission, the end faces of the connector portions are in direct contact with each other. Since the present optical fibres exhibit a very low degree of attenuation (approximately 0.2 dB/kin) the inevitable losses in connectors, referred to as insertion losses, must be minimized. According to the latest developments a lower limit of approximately 0.2 dB should be attainable in practice.

In the case of cable connections for use in the communication field, for example a HDTV camera and its processor unit, the interconnected optical fibres may have lengths up to several kilometers and depending upon the application said fibres may, in pan, be composed of fibre sections of different lengths which are interconnected by connectors. In order to bridge the distance between camera and processor unit with the greatest flexibility when recording various events on location, for example outdoor sport events, it has proved to be advantageous to interconnect a suitable number of prefabricated optical fibre sections comprising connectors. When said optical fibre sections are rapidly interconnected, it is possible, however, that impurities such as dust or dirt may cause damage to the optical interfaces of the mating connector portions which are very sensitive to impurities.. In that case the optical fibre sections comprising the damaged connector portions must be replaced by optical fibre sections comprising undamaged connector portions, because replacing the connector portions at the ends of monomode optical fibres can only be carried out by the manufacturer. However, this is very expensive and time-consuming.

SUMMARY OF THE INVENTION

Therefore, it is an object of the invention to provide a connector for optical fibres of the type mentioned in the opening paragraph, the damaged connector portion of which can be replaced in a cost-effective and simple manner.

The arrangement has the advantage that in the case of a damaged connector portion only two interconnected connector portions must be replaced instead of the entire optical fibre cable to be connected.

It is very advantageous that each of the connector portions of the central connector can be replaced by the corresponding connector portion of the two outer connectors. Consequently, in the case of an outside broadcast the only spare parts required are these small connector portions.

DETAILED DESCRIPTION OF THE PREFERRED EMBODIMENTS

Figure 1:
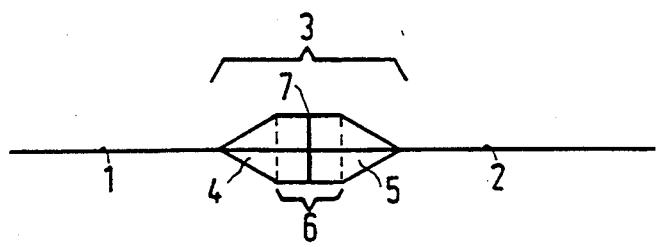

FIG. 1 shows the principle of a conventional connector, in which an optical fibre 1, for example a monomode fibre having a length of approximately 500 m, is connected to a corresponding optical fibre 2 through a connector 3 comprising a first connector portion 4 connected to the fibre 1, a second connector portion 5 connected to the fibre 2 and a coupling sleeve 6. Said coupling sleeve can be connected to both connector portions by, for example, screw connections. Said connector pair 3 can be separated at the location of reference numeral 7. As described above, the penetration to dirt or dust into the connector may cause damage to either one of the disconnected connector portions 4 and 5 as they are reconnected. This applies in particular to the very sensitive end faces of the optical fibres which are in contact which each other after the connector portions have been reconnected. In this case, the cable comprising the damaged connector portion must be replaced entirely, since replacing solely the damaged connector portion of the cable can only be carried out by the manufacturer.

Figure 2:
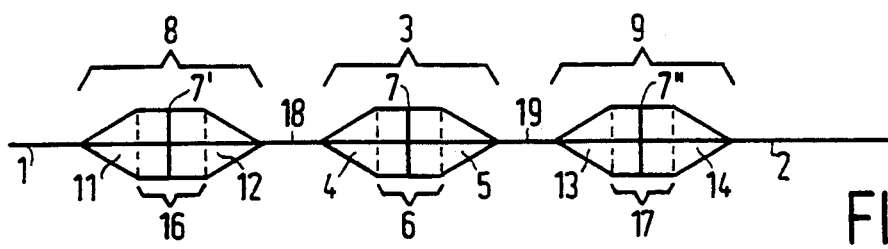

To overcome this disadvantage, it is proposed in accordance with a first exemplary embodiment of the invention illustrated in FIG. 2, to arrange three connectors 3, 8 and 9 between the fibres 1 and 2 instead of only one. Also these connectors 8 and 9 comprise connector portions 11,12 and 13,14, respectively, as well as a coupling sleeve 16 and 17, respectively. The connectors 8 and 3 and the connectors 3 and 9 are connected to each other by a short length 18 and 19, respectively, of an associated fibre. Also in this case connector pair 3 is used to disconnect the fibres 1 and 2 at the location of reference numeral 7. If either one of the connector portions 4 and 5 is damaged, this can be remedied in a short time and at low cost by means of the prefabricated spare parts 4,18 and 12 or 5,19 and 13.

Figure 3:
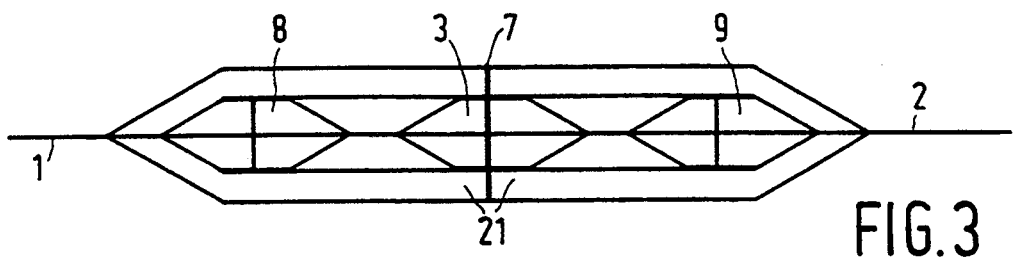

An interesting modification of this embodiment in accordance with the invention is diagrammatically shown in FIG. 3, in which the connectors 3,8 and 9 are accommodated in a housing 21 which can be divided into two parts at the location of reference numeral 7. Said connectors can be secured in the housing by means of, for example, screws, so that by undoing one or several screws damaged connector parts can be removed from the housing. Also in this case, the two portions constituting the housing 21 can be interconnected by means of a coupling sleeve (not shown).

Figure 4:
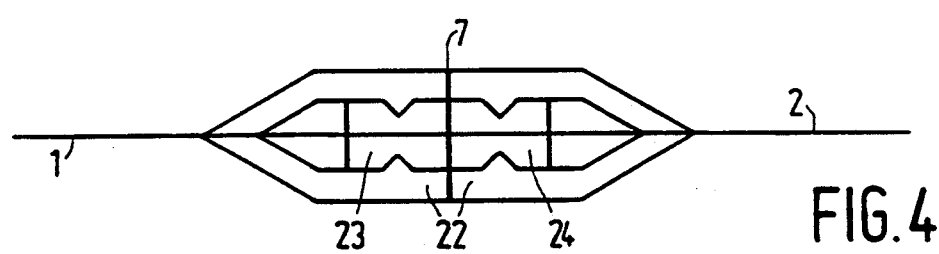

FIG. 4 shows a further advantageous modification of the connector in accordance with the invention. In said arrangement, the connector portions 4 and 12 as well as the connection fibre 18 are combined into a connector portion 23 which is essentially in the form of a continuous connector pin. A corresponding connector portion 24 comprises the connector portions 5 and 13 and connection fibre 19. Also in this case a damaged connector portion 23 or 24 can be readily replaced. Such a connector portion comprises, for example, a short length of fibre which is secured in a sleeve by clamping or by using an adhesive, and which can be readily removed from or secured in said connector housing 22 by screwing.

Figure 5:
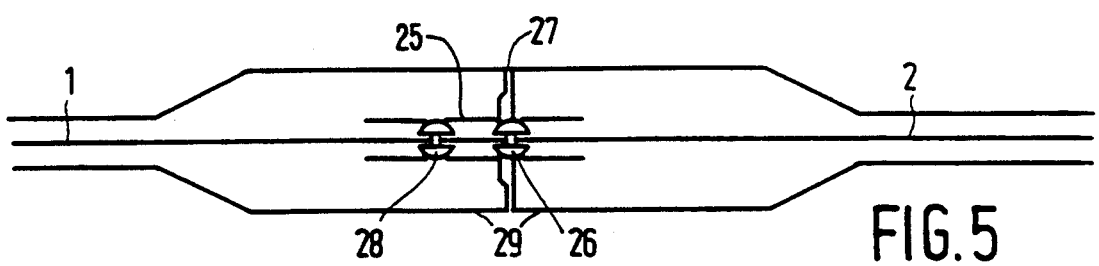

FIG. 5 diagrammatically shows a different type of connector. With this type of connector the connector portions are not interconnected by a coupling sleeve but instead by a coupling ball which is located at the area of joint 27, and a further coupling ball 28 is provided to establish the connection with the fibre 1. The coupling balls 26 and 28 are in principle metal balls, for example steel balls, having a bore for accommodating both connector portions, a protective layer in the form of a plastic optical material having the same refractive index as the connected glass fibre being provided in the contact area of both connector portions. The connectors comprising the balls 26 and 28 are accommodated in a housing 29. When the connector pair is disconnected at the location of reference numeral 27, the coupling ball 26 is present in the right-hand portion of the housing, so that in general the connector portion of the fibre cannot be damaged. In case of damage to connector portion 25, said portion can be replaced in a simple manner. Of course, the coupling balls 26 and 28 can also be replaced. The housing portions of the connector in accordance with FIG. 5 have different configurations. They are interconnected by means of a coupling sleeve (not shown).

Figure 6:
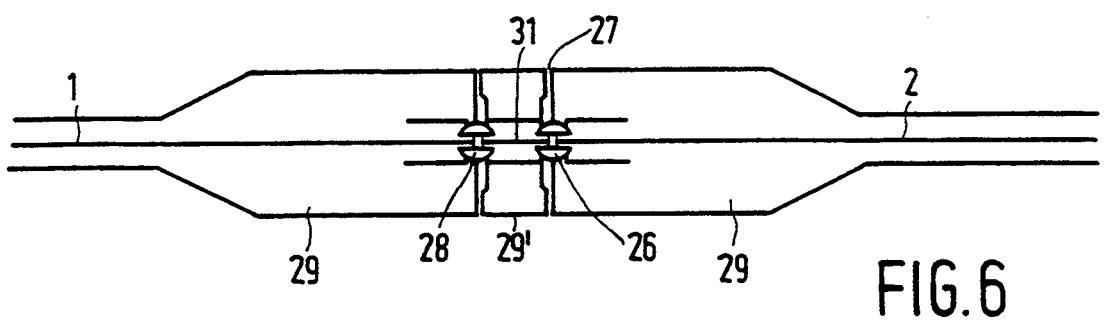

In FIG. 6 a modification of a connector having coupling balls 26 and 28 is diagrammatically shown, which comprises an intermediate connector portion 31 in a housing 29' which can also be replaced in a simple manner in case of damage to connector portions of the balls 26 and/or 28. Housing portion 29' preferably serves as a coupling sleeve which is connected to the housing portions 29 by, for example, screwed joints. Of course, portion 29' can be replaced instead of portion 31. Also in this modified embodiment, the coupling balls 26 and 28 present in the housing portions 29 upon disconnecting the connector pair at the location of reference numeral 27 can be replaced in a simple manner. Also in this embodiment, the coupling balls comprise a plastic optical material which serves as a protective layer. Said layer protects the end faces of the glass fibres 1, 2 against damage.

It is noted the connectors in accordance with the invention cannot only comprise glass-fibre connections but also electrical connections.

I claim:

1. A connector for connecting first and second optical fibers comprising:

first and second housings for engaging said first and second optical fibers, respectively, each of said first and second housings disposing its respective optical fiber at a first predetermined position;

first and second releasable portions for engagement with said first and second housings respectively, a length of optical fiber being disposed in each of said first and second releasable portions such that the end portions of said optical fibers in said first and second releasable portions are exposed and located in a second predetermined position, means for engaging said first and second releasable portions with said first and said second housings respectively, when said first and second releasable portions are in engagement with their respective first and second housings, said optical fiber of said first and second releasable portions being disposed in face-to-face relationship with the respective first and second fiber disposed in said first and second housings and when said first and second housings are engaged with their respective first and second releasable portions and said first and second housings are disposed in face-to-face relation the optical fiber in said first releasable portion being positioned in alignment with the fiber disposed in said second releasable portion.

2. The connector as claimed in claim 1 at least one of releasable portions includes a coupling ball, said ball having a bore, a plastic optical material having the same refractive index as the glass fiber being provided in the bore, said coupling ball forming a point of contact between said first and second housings.

3. The connector as claimed in claim 1, wherein said coupling ball is releasably engageable with at least one said releasable portion.

4. The connector as claimed in claim 2 wherein said coupling ball is metal.

* * * * *